(12) United States Patent
Lane

(10) Patent No.: US 10,222,763 B2
(45) Date of Patent: Mar. 5, 2019

(54) REMOTE ISOLATION SYSTEM AND MOBILE DEVICE FOR USE IN THE REMOTE ISOLATION SYSTEM

(71) Applicant: Remsafe Pty Ltd, Balcatta, Western Australia (AU)

(72) Inventor: Michael Charles Lane, Dianella (AU)

(73) Assignee: REMSAFE PTY LTD, Balcatta (AU)

( * ) Notice: Subject to any disclaimer, the term of this patent is extended or adjusted under 35 U.S.C. 154(b) by 357 days.

(21) Appl. No.: 15/199,552

(22) Filed: Jun. 30, 2016

(65) Prior Publication Data

US 2017/0003662 A1   Jan. 5, 2017

(51) Int. Cl.
| | | |
|---|---|---|
| G05B 9/02 | (2006.01) | |
| B65G 43/00 | (2006.01) | |
| H04W 88/02 | (2009.01) | |

(52) U.S. Cl.
CPC .............. *G05B 9/02* (2013.01); *H04W 88/02* (2013.01)

(58) Field of Classification Search
CPC ................................. G05B 9/02; H04W 88/02
See application file for complete search history.

(56) References Cited

U.S. PATENT DOCUMENTS

| | | | |
|---|---|---|---|
| 2,166,061 A | 8/1937 | Kirk | |
| 4,210,788 A | 7/1980 | Stranczek | |
| 4,863,006 A | 9/1989 | Kotkata et al. | |
| 6,442,452 B1 | 8/2002 | Kopke | |
| 6,537,797 B1 | 3/2003 | Picardal et al. | |
| 6,892,115 B2 | 5/2005 | Berkcan et al. | |
| 7,151,329 B2 | 12/2006 | Andarawis et al. | |
| 7,311,247 B1 | 12/2007 | Lenner | |
| 7,340,311 B2 | 3/2008 | Landis et al. | |
| 7,716,489 B1 | 5/2010 | Brandt et al. | |
| 7,793,774 B2 | 10/2010 | Cole et al. | |
| 8,364,292 B2 | 1/2013 | Ebner | |
| 2003/0000358 A1 | 1/2003 | Harris et al. | |

(Continued)

FOREIGN PATENT DOCUMENTS

| | | |
|---|---|---|
| AU | 201400216 | 4/2014 |
| CN | 201376581 | 1/2010 |

(Continued)

OTHER PUBLICATIONS

Montague, Jim, "Mining, Minerals and Cement Forum: A Rich Vein of Automation Innovation," Control—Promoting Excellence in Process Automation, http://www.controlglobal.com/articles/2014/automation-fair-25, Nov. 21, 2014.

(Continued)

*Primary Examiner* — Sisay Yacob
(74) *Attorney, Agent, or Firm* — Cislo & Thomas, LLP

(57) ABSTRACT

A remote isolation system (10) for a plant comprising equipment (20,21) energizable by an energy source (30) and a control system (50,260) enabling automated isolation of the equipment (20,21) from said energy source (30) to an isolated state when authorized by the control system (50, 260), wherein said control system (50,260) enables remote isolation of the equipment (20,21) by one or more mobile isolation device(s) (120) provided as part of the remote isolation system (10) and configured to request the control system (50,260) to authorize equipment (20,21) isolation.

35 Claims, 7 Drawing Sheets

(56) References Cited

U.S. PATENT DOCUMENTS

| | | |
|---|---|---|
| 2003/0014779 A1 | 1/2003 | Drotning |
| 2005/0190056 A1 | 9/2005 | Lacy et al. |
| 2005/0253689 A1 | 11/2005 | Mollet et al. |
| 2008/0078658 A1 | 4/2008 | Poyner et al. |
| 2008/0190749 A1 | 8/2008 | Poyner et al. |
| 2009/0140856 A1* | 6/2009 | George ............... F16P 3/08 340/542 |
| 2010/0030345 A1 | 2/2010 | Cole et al. |
| 2010/0085153 A1 | 4/2010 | Smith |
| 2013/0083805 A1 | 4/2013 | Lu et al. |
| 2013/0146427 A1 | 6/2013 | Greirson |
| 2013/0214903 A1* | 8/2013 | Kalous ............... G05B 1/01 340/5.61 |
| 2013/0307694 A1 | 11/2013 | Amar |
| 2014/0111303 A1 | 4/2014 | Scharnick |
| 2014/0176303 A1* | 6/2014 | Stratton ............ G08C 17/02 340/5.61 |
| 2014/0283008 A1 | 9/2014 | Daino et al. |
| 2015/0091485 A1 | 4/2015 | Lemberg et al. |
| 2015/0108840 A1 | 4/2015 | Lane et al. |

FOREIGN PATENT DOCUMENTS

| | | |
|---|---|---|
| CN | 203027378 | 6/2013 |
| EP | 0400264 | 12/1990 |
| EP | 0553885 | 8/1993 |
| EP | 1502893 | 2/2005 |
| EP | 1821264 | 8/2007 |
| EP | 2367190 | 9/2011 |
| EP | 2637068 | 9/2013 |
| EP | 2842149 | 3/2015 |
| GB | 263960 | 1/1927 |
| JP | H06144764 | 5/1994 |
| WO | WO 2011/031410 | 3/2011 |
| WO | WO 2011/047428 | 4/2011 |
| WO | WO 2012/142674 | 10/2012 |
| WO | WO 2013/160275 | 10/2013 |

OTHER PUBLICATIONS

Ampcontrol, Inc., "Remote Isolation Increasing Personnel Safety and System Productivity," Nov. 2014.

Lane Mike, "Remote isolation of fixed plant using the innovative, safe and fast REMSAFE," ICM Technologies, Jul. 17, 2012.

Rockwell Automation Inc, ,"Adjustable Frequency AC Drives," Powerflex 4M Technical Data, 22F-TD001B-EN-P, literature. rockwellautomation.com/idc/groups/literature/documents/td/22ftd001_en_p.pdf, 1-20, Jun. 2013.

Rockwell Automation Inc, "Powerflex 20-HIM-A6 and 20-HIM-C6S HIM (Human Interface Model)," User Manual, rockwellautomation.com/idc/groups/literature/documents/um/20him-um001_-en-p.pdf, 1-74, Feb. 2013.

Rockwell Automation, "Protective Measures and Complementary Equipment—Trapped Key Interlocks" web.archive.org/web/20150315070238/http://www.ab.com/en/epub/catalogs/3377539/5866177/3378076/7131359/Trapped-Key-Interlocks.html, 1-1-1-78, Mar. 15, 2015.

Allen Bradley, "Prosafe Trapped Key Systems—Easy Selection Guide," http://www.nhp.com.au/files/editor_upload/File/Brochures/Business-Specific/easyselectionguides/NHPNTUPROTRAPABESG.pdf, 1-12, Feb. 2015,

* cited by examiner

REMOTE ISOLATION SYSTEM AND MOBILE DEVICE FOR USE IN THE REMOTE ISOLATION SYSTEM

This invention relates to a remote isolation system for isolating equipment and a mobile device for use in the remote isolation system. More specifically, the invention relates to a remote isolation system where equipment isolations are facilitated by the mobile device.

Various types of equipment must be isolated from a range of energy sources including electrical energy (the most common) and mechanical energy including pressure and potential energy to enable safe maintenance and other work to be carried out. Conveyor belt systems used in the mining industry for transporting iron ore or other bulk materials which can span significant distances are one such example of equipment which may require to be isolated from time to time.

The distances can be in the range of many kilometers. Such conveyors are typically powered by electric drive motors: three phase electrical power is supplied wherein the voltage may range from low voltage ranges (from below 800V to 1000V AC), to medium and high voltage ranges (in the multiple kV range and extending to above 10 kV AC and even 33 kV AC). Such conveyors typically include corresponding brake systems which are also electrically operated.

Although different mine procedures and relevant safety standards may apply, a typical pre-requisite before permitting mechanical maintenance or other activity involving access to the conveyor belt system involves the electrical isolation of the conveyor belt system. This isolation ensures that the energy source powering the conveyor belts and associated equipment, i.e. electrical power, is removed from systems or components that—if energised—could cause a safety hazard. It will however be understood that equipment items other than conveyor systems and other mining industry equipment also require isolation for maintenance and other purposes.

The isolation process is invariably safety critical and has, in the past, been time consuming, as described for example in the introduction to the Applicant's granted Australian Patent No. 2010310881 and International Publication No. WO2012/142674, the contents of which are hereby incorporated herein by way of reference.

The remote isolation system described in Australian Patent No. 2010310881 enables equipment isolation to be requested at a fixed position remote isolation station associated with the equipment and subsequently approved through a plant control system, without mandatory visitation to the equipment by authorised isolation personnel. This remote isolation system significantly reduces the time required to achieve safe isolation, and more specifically the production downtime that would normally be involved with such an isolation which can be very costly.

Plants involving such remote isolation systems, as well as other remote isolation systems, may extend over very large areas. Accordingly, costs associated with connecting components of the remote isolation system to each other and the control system (including master controller(s)), by dedicated cable connections may become significant. For example, the installation of fibre optic cable for a material handling plant in the field (which may be subject to extreme environmental conditions) is typically costly due to the requirement of needing to use elevated work platforms and scaffolding (to reach higher elevations in conveyor belt system(s) for example). Such difficulties are further compounded by the long and arduous task of removing cable ladder covers and then replacing them after the cable has been installed. Other tasks with similar difficulty, hazard or inconvenience include installing cables where cable drums need to be placed into position with a crane, and where road closures and traffic management and other ancillary tasks are also involved in the cable installation process.

Further, such challenges may be particularly acute where equipment to be isolated is located in a changing terrain or landscape, such change occurring—for example—due to mining or construction activity. Seasonal changes, such as through flooding in wet seasons, may also cause landscape changes. Installation costs for adapting the power grid to the changing terrain or landscape over time may adversely affect project economics and a solution to this problem is required.

Still further, the Applicant has found that for certain installations, using fixed position remote isolation stations, an operator may spend significant time moving between remote isolation stations and areas where maintenance or other work needs to be performed. Such time translates into lost production time for a plant and this is sought to be minimised as much as possible without compromising safety.

It is an object of the present invention to further develop its remote isolation system to provide economic solutions to the communications and power supply requirements of a remote isolation system, whereby such isolation systems are not limited to those systems developed by the Applicant.

With this object in view, the present invention provides a remote isolation system for a plant comprising:

equipment energisable by an energy source; and a control system enabling automated isolation of the equipment from said energy source to an isolated state when authorised by the control system, wherein said control system enables remote isolation of the equipment by one or more mobile isolation device(s) provided as part of the remote isolation system and configured to request the control system to authorise equipment isolation.

Preferably, the control system enables isolation through a wireless communications network, preferably using an open communications protocol, which includes the one or more mobile isolation devices configured to request the control system to authorise equipment isolation.

Such mobile isolation devices conveniently enable wireless communication with the remote isolation control system to enable equipment isolation on authorisation of a permissible request from an operator. The mobile isolation device desirably comprises a console having a display for displaying information about the remote isolation system and equipment; an input means for requesting a control system of the remote isolation system to enable automatic equipment isolation through the above described wireless communications network; and an isolation switch for isolating said equipment when a permissible isolation request is authorised by the control system. The mobile isolation device also provides an isolation lockout point in such circumstances, for example as described below.

Conveniently, the mobile isolation device includes stop and start controls for facilitating equipment isolation on authorisation of the permissible request from the operator. Preferably, the mobile isolation device is configured to engage with a fixed remote isolation station arranged to house a corresponding mobile isolation device. The mobile isolation device is ideally designed to dock with a docking station provided within the fixed remote isolation station or at other convenient locations. Furthermore, the mobile isolation device may also include locating means so that the whereabouts of the mobile isolation device can be easily determined, for example when it is away from the docking station provided within the fixed remote isolation station. Docking station function is described further below.

The use of such a mobile isolation device enables operator mobility to be significantly increased since the portability of the isolation device makes it unnecessary for the operator to travel to and fro between a fixed remote isolation station (typical of conventional remote isolation systems) and the required work or maintenance area. This can help reduce downtime and ultimately improve plant productivity, particularly in plants where equipment items extend over a substantial distance and have fixed remote isolation stations also spaced a substantial distance apart. Mobile isolation devices enable operator(s) to bridge the physical distance gap between the remote isolation stations. In this way, when an operator notices an issue requiring attention on the equipment item or tasks relating to it, return to a fixed remote isolation station is not necessary. The mobile isolation device enables an isolation request to be logged and approved by the control system as soon as the issue is noticed. The mobile isolation device may also enable isolation switch isolation and lockout as described below. That said, the remote isolation system may include one or more fixed isolation stations.

The control system of the remote isolation system is desirably configured to effect a standalone isolation of the equipment. The control system may however be configured with a plurality of equipment isolation modes, as described in the Applicant's Australian Provisional Patent Application No. 2015902558 filed on 30 Jun. 2015, the contents of which are hereby included herein by way of reference. In such case, the input means of the mobile isolation device may allow an operator to select one of a number of different equipment isolation modes. Where a plurality of mobile isolation devices are comprised within the remote isolation system, each input means may allow each operator to select the same or a different plurality of equipment isolation modes dependent on the operator's authority in accordance with data and rules governing an isolation process. The latter situation is more typical because operators are likely to have different tasks and authorities during an isolation process. The term "isolation process" comprehends both isolation and de-isolation operations.

The mobile isolation device of the present invention is particularly useful where the control system is configured to isolate an equipment item whilst leaving other associated equipment items either operating or in an operational state. That is, the isolation could "exclude" certain equipment items in a specific isolation mode. Such an exclusive isolation mode may be used where maintenance or other tasks on a particular equipment item require associated equipment to remain energised. Accordingly, the isolated and operational equipment items will typically form part of a particular system or sub-system of a plant which may be provided with a number of fixed remote isolation stations. One example of such a system is a conveyor belt system in a material handling plant with a plurality of fixed remote isolation stations arranged, potentially a substantial distance apart, along the length of a conveyor belt A conveyor belt drive motor may require to be isolated for maintenance purposes, but the brakes associated with the belt system require to remain energised to enable safe working on the conveyor belt. With the mobile isolation device, required equipment (for example a conveyor brake system) can be stopped or started with the operator in the most convenient position available and importantly not tied to the position of a fixed remote isolation station resulting in savings in time and money spent on potentially complex maintenance tasks.

The mobile isolation device may be rendered inoperative if the remote isolation system is bypassed or over-ridden in the event of a system fault, in such a case, the isolation switch must be locked in a normal operating position.

The mobile isolation device may also include means for engaging a personal isolation lock if required as part of an isolation procedure. More specifically, the mobile isolation device may include an isolation switch for facilitating an isolation of certain equipment. The isolation switch may be as described in the Applicant's Australian Provisional Patent Application No. 2016902554 filed on 30 Jun. 2015, the contents of which are hereby incorporated herein by way of reference. The engaging means may be presented to an operator by the mobile isolation device when the isolation switch is in an isolated position. The engaging means could be a sliding element concealed within a socket of the console of the mobile isolation device when equipment is energised but which slides into position when the equipment is isolated in similar manner to a lock bolt. The sliding element may be provided with attachment means, such as an aperture, for attaching a personal isolation lock. On de-isolation, the engaging means can again be concealed, for example by retraction of the sliding element into the socket of the console of the mobile isolation device.

The mobile isolation device may also be configured for use to perform plant tasks, other than isolation, including equipment monitoring and interrogation of plant status. The mobile device may also be used for authorised communications with other site personnel.

The mobile isolation device is preferably provided with its own power supply which may comprise a re-chargeable battery arrangement. As alluded to hereinbefore, the mobile isolation device is conveniently dockable for configuration to desired equipment and may be engaged at a fixed remote isolation station. A mobile isolation device may be docked— when not used for isolation—at a docking station conveniently formed as part of a related or specific fixed remote isolation station for re-configuration to the same or different equipment. Such docking, as understood in the computer art, may facilitate at least one purpose selected from the group consisting of re-charging of the mobile isolation device, communication with and programming by the control system and plugging in to other peripherals of the remote isolation system.

Preferably, the mobile isolation device can only be withdrawn or 'undocked' on approval by the control system, particularly when an exclusive control or maintenance mode is activated at the docking station. The mobile isolation device can also serve as a normal fixed place remote isolation device when docked. However, the mobile isolation device cannot be undocked when the aforementioned isolation lockout switch is in the isolated position.

In terms of the mobile isolation device plugging in to other peripherals of the remote isolation system, such peripherals may include printers and other devices enabling downloading of data from the mobile isolation device. Remote isolation software updating may also be something that is preferred when the mobile isolation device is in a docked position.

The docking station also facilitates security when it is placed in a known secure location, possibly being made unavailable for use until approved by the control system. Removal of a mobile isolation device from the docking station may require authorisation and possibly unlocking through a keyed operation which may involve a key exchange unit as described in the Applicant's Australian Provisional Patent application No. 2015902557 filed on 30 Jun. 2015, the contents of which are hereby incorporated herein by way of reference. The docking station may include other security features for example triggering an alarm if removal from an authorised location is attempted. The mobile isolation device could be configured, in another embodiment, to only be operated following operator identity verification using operator identification devices such as described in the Applicant's Australian Provisional Patent Application Nos. 2015902559 and 2015902564 each filed on 30 Jun. 2015, the contents of which are hereby incorporated herein by way of reference. Such operator identification device for receiving operator identification data from an operator identification means would be provided for each mobile isolation device. A range of operator identification devices and operator identification means could be used, the latter conveniently being a smart device. A smart card identification system could be implemented using a card reader included within the mobile isolation device.

Operator identification data would be stored in the operator identification means, for example a smart card, following a conventional process and such data could include, or be tied to, isolation permits to work on relevant equipment. Smart card validity could be checked in the field. Other smart devices could be used to similar effect. This option identifies the operator using the mobile isolation device (when not in docked position) and reduces the risk of accidental or deliberate misuse of the remote isolation system, as well as risk of error in issuing isolation permits through manual documentation systems which can also be time consuming to use and check. Such benefits can contribute to increasing safety and reducing lost production time for maintenance purposes.

Further, a smart device or smart card may be used for lock out of an isolation lockout switch, preferably when provided as part of the mobile isolation device.

In addition, mobile isolation devices, especially when operator borne and compact, may readily be moved to cover multiple isolation configurations (such as in railyards) and/or as the terrain around them and plant equipment changes, for example due to mining, construction activity and/or seasonal changes (such as flooding rains) changing a landscape, for example a mine pit, or as equipment with which they are associated is moved to a new location. Installation costs and time are therefore reduced over prior systems or even avoided for practical purposes.

The wireless communications network of the remote isolation system may be one that is similar to that which is described in the Applicant's Australian Provisional Patent Application No. 2015902581 filed on 30 Jun. 2015, the contents of which are hereby included herein by way of reference. Such a wireless communications network desirably uses an open communication protocol rather than a proprietary system developed by unrelated third parties to the plant operator/owner. Use of an open communication protocol allows greater interoperability between the remote isolation system and the plant control system. Plant personnel may also troubleshoot communication issues and manage the wireless communications network more easily by way of the mobile isolation device. An Ethernet or other industry robust and accepted protocol may conveniently be use for the wireless communications network, in certain circumstances, this would be difficult, if possible, with a closed third party communication protocol. In addition, such third party communications networks tend to have stability issues avoided by using a communications protocol, such as the Ethernet protocol, established for industrial use.

Where wireless technology is used, the same safety protocol is used over this medium, as it would be for a physical connection. Thus the same safety related standards regarding protection from communication errors, such as repetition, loss, incorrect sequence, delay and corruption are maintained. In addition to this, industry standard wireless encryption protocols are used, typically WPA2-PSK.

The equipment remote isolation system may be retrofitted to existing equipment and plant in a range of industries, for example the materials handling and mining industries. The remote isolation system may also advantageously be used for isolating rail system components in railway infrastructure as described in the Applicant's Provisional Patent Application No. 2015902560, the contents of which are hereby incorporated herein by way of reference.

The term "isolation" as used in this specification is to be understood in its maintenance engineering and legal sense as not simply turning off a supply of energy to equipment, whatever the nature of that energy, but removing and/or dissipating energy to provide a safe work environment as required by applicable occupational health and safety regulations. In the case of electricity, as just one example, isolation is not achieved simply by turning off a power supply to the equipment, in such cases, the equipment could accidentally re-start or be restarted and cause injury to personnel, or worse. Isolation instead prevents such accidental re-starting and typically will also involve processes to dissipate any hazardous stored energy, in whatever form that energy may take (e.g. potential energy), from the equipment. For example, such an additional energy dissipation step could be effected in respect of a conveyor belt system by way of the braking cycle procedure as described in the Applicant's Australian Provisional Patent Application No. 2015902565, the contents of which are incorporated herein by way of reference.

The remote isolation system and mobile isolation device of the present invention may be more fully understood from the following description of preferred embodiments thereof made with reference to the accompanying drawings in which.

Figure 1:
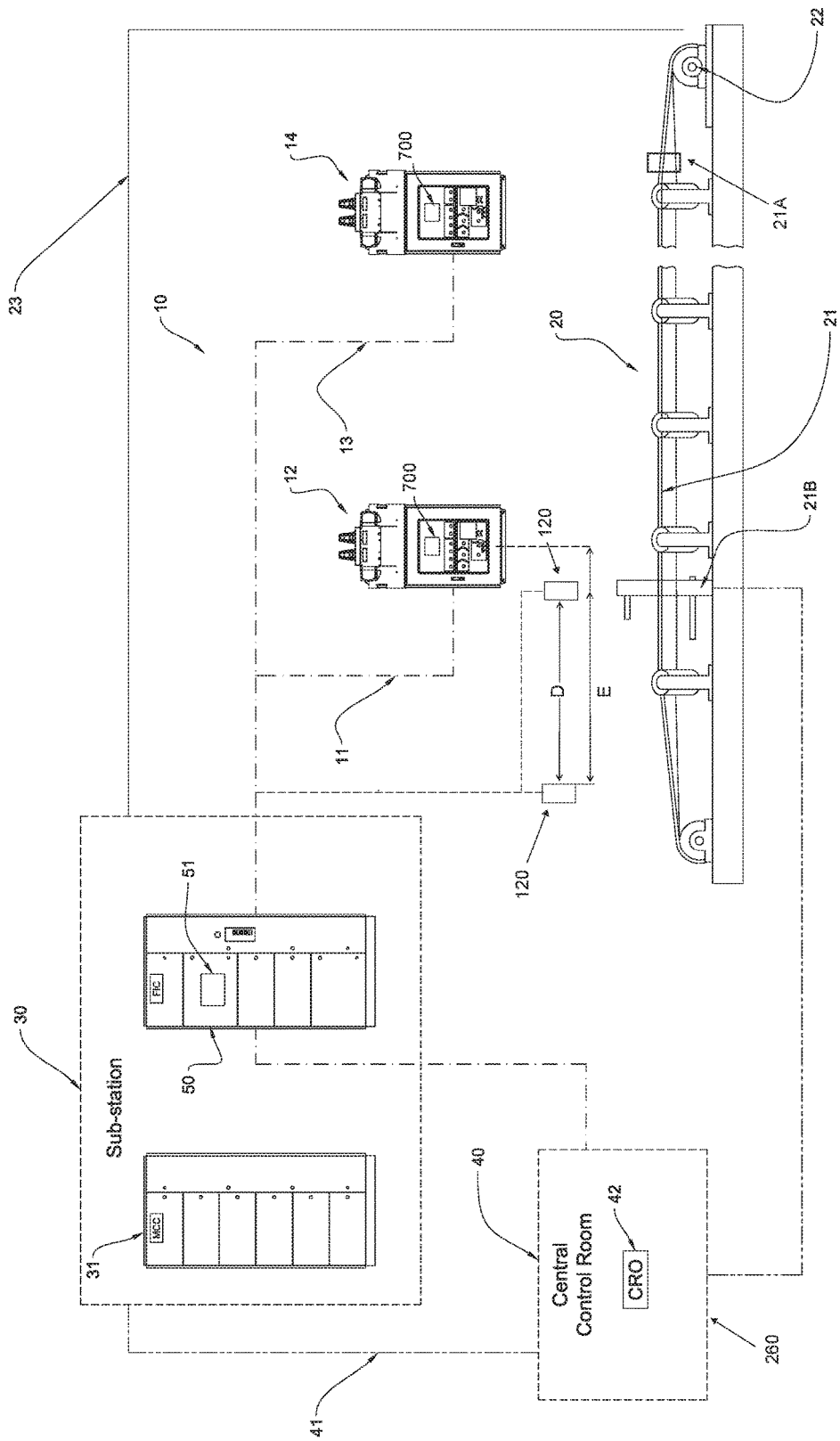
FIG. 1 shows a schematic layout of a remote isolation system as applied to a conveyor belt system and configured in accordance with one embodiment of the present invention.

Referring to FIG. 1, there is shown a schematic layout of a remote isolation system 10, as retrofitted to an existing conveyor belt system 20, for example a long range conveyor system for conveying iron ore from a mine site to a port for shipment. The conveyor belt system 20 comprises a troughed conveyor belt 21 having a head pulley motor 22 driven by an electrical energy supply emanating from electrical contacts 31, whether provided as contactors or circuit breakers. One contact is a standard contactor for "ON"/ "OFF" operation of the motor 22. The head pulley motor 22 is powered through a variable speed drive (VSD) which is electrically powered from a three phase AC power supply line 23 providing voltages of less than 1000V AC. Conveyor belt 21 is also provided with an electrically powered braking system 21A and tramp metal detector (TMD) 21B which detects tramp metal and indicates a fault if such tramp metal is present. Isolation of the conveyor belt system 20 is then required to address the fault and re-set the conveyor belt system 20 for continued use.

Electrical power for the conveyor belt system 20 is supplied from a source in the form of sub-station 30. The sub-station 30 houses the electrical contacts 31. Activation of the contacts 31 (i.e. placing them in the "off" or "break" state), de-energises all three phases of the electrical supply to the conveyor head pulley drive motor 22. Activation of contacts 31 also de-energises all three phases of the electrical supply to the conveyor braking system 21A. Such de-energisation is continuously monitored by a voltage monitor relay (not shown) located downstream of contacts 31, i.e. on the conveyor belt system 20 side of the contacts 31.

The conveyor belt system 20 and sub-station 30 are under the control and supervision of a plant control system 260 having a central control room (CCR) 40, via a DCS (Distributed Control System), PLC (Programmable Logic Controller) and SCADA (Supervisory Control and Data Acquisition System) as are commonly used and would be well understood by the skilled person. Item 41 in FIG. 1 is representative of a communication and control network between the CCR 40 and the various other plant systems and components. A Control Room Operator (CRO) 42 is located within the CCR 40 and has various input/output devices (I/O) and displays available (not shown) for the proper supervision and control of the conveyor belt system 20. Except for the remote isolation system 10, the above description represents what may be considered a conventional system as would be known within the materials handling and mining industries.

The remote isolation system 10 comprises operator borne mobile isolation devices 120 described in further detail below. Fixed remote isolation stations 12 and 14 also available for use if required. Remote isolation stations 12 and 14 may include a control panel 700 as described, for example, in the Applicants Australian Provisional Patent Application No. 2015902561, the contents of which are hereby incorporated herein by way of reference.

Mobile isolation devices 120, unlike fixed remote isolation stations also effectively used in systems such as described in Australian Patent No. 2010310881, can be used anywhere around conveyor belt system 20 providing significant flexibility and reducing the need to spend time travelling to and fro between fixed remote isolation stations 12,14 for communications tasks and maintenance tasks in a work area of the conveyor belt system 20. This ability should help reduce downtime and increase productivity without compromising safety. That is, the mobile device 120 enables time savings to be realised through the control of the plant, namely isolation, being made available to an operator at any point near or at the plant without having to locate the nearest isolation point that is inevitably remote from the location of the required job.

The remote isolation system 10 also includes a master controller 50 incorporating a human/machine interface (HMI) in the form of a touch sensitive screen 51 which displays human interpretable information. The master controller 50 is also located within sub-station 30.

Remote isolation stations 12, 14 and mobile isolation devices 120, two of which are shown and carried by operators a distance D apart, communicate with the master controller 50 via wireless communication channels 11 and 13. The communication channels 11 and 13 may also form part of a wireless communications network for controlling the conveyor belt system 20 so saving costs and difficulty involved with installing fibre-optic or other cable as described above.

The wireless communications network used in the control of conveyor belt system 20 requires a communication protocol to work effectively. This communication protocol is selected for ready interoperability with other plant components making maintenance and trouble shooting requirements easier. That is, the communication protocol is open, not closed. Plant personnel are not precluded from refining the communication protocol or left susceptible to system failures that only a third party to the plant operator/owner can address.

In this case, the communication protocol involves an open industrial communication protocol such as Ethernet. This is particularly preferred to enable flexible system updating. Ethernet software is widely accepted and established for use in industrial plants and so further detailed description of such software is unnecessary here.

Communications relating to remote isolation must be via safety rated communications protocol and software noting that these may be varied depending on the PLC platform used. For example, the Interbus Safety, Ethernet/IP or PROFIsafe software solutions provide an indication of existing systems which are well known within the mining and materials handling industries. This will ensure that the communication channels are monitored and diagnostic tools are available for fault control and rectification when required, hence maintaining the required safety integrity level (SIL) of the plant.

Further description of the electrical layout and operation of the remote isolation system 10 is provided in the Applicant's granted Australian Patent No. 2010310881, the contents of which have been incorporated herein by reference.

Referring now to FIGS. 2 to 7, each mobile isolation device 120 comprises a console 122 having a control panel 124. It should be noted that for certain specific applications, the mobile isolation device could take the form of a re-configured smart phone in which telephonic function (or Voice Over Internal Protocol (VOIP)) is integrated for communications with CRO 42. Control panel 124 is used for implementing the Applicant's remote isolation system 10 and includes an antenna 126 for implementing wireless communications, in the above described manner, with plant control system 260 and master controller 50. Wireless communications are line of sight with additional repeaters used if necessary to maintain satisfactory communications integrity. Plant transport vehicles may also include such repeaters.

Mobile device 120 is powered by a rechargeable battery (not shown). The mobile isolation device 120 is manually portable having dimensions (provided as an example only) of 230 mm×370 mm. Such portability may be particularly convenient, for example, for teams of operators inspecting the conveyor belt system 20 for failed or failing bearings in idler rollers. In such a scenario, a conveyor roller change out team would walk or drive slowly alongside the conveyor belt 21 listening for failed or failing bearings in the rollers.

When a roller for replacement is located, the operators could use the mobile device 120 to stop the conveyor, isolate the system at the job location, and then manually lockout as required, whereafter it would be safe to replace the roller. In addition, inclusion of a locator device (for determining GPS location) within the mobile isolation device 120 allows the isolation to be recorded by the plant control system 260 by date, time and location. This information can usefully be used to plan future maintenance.

Figure 2:
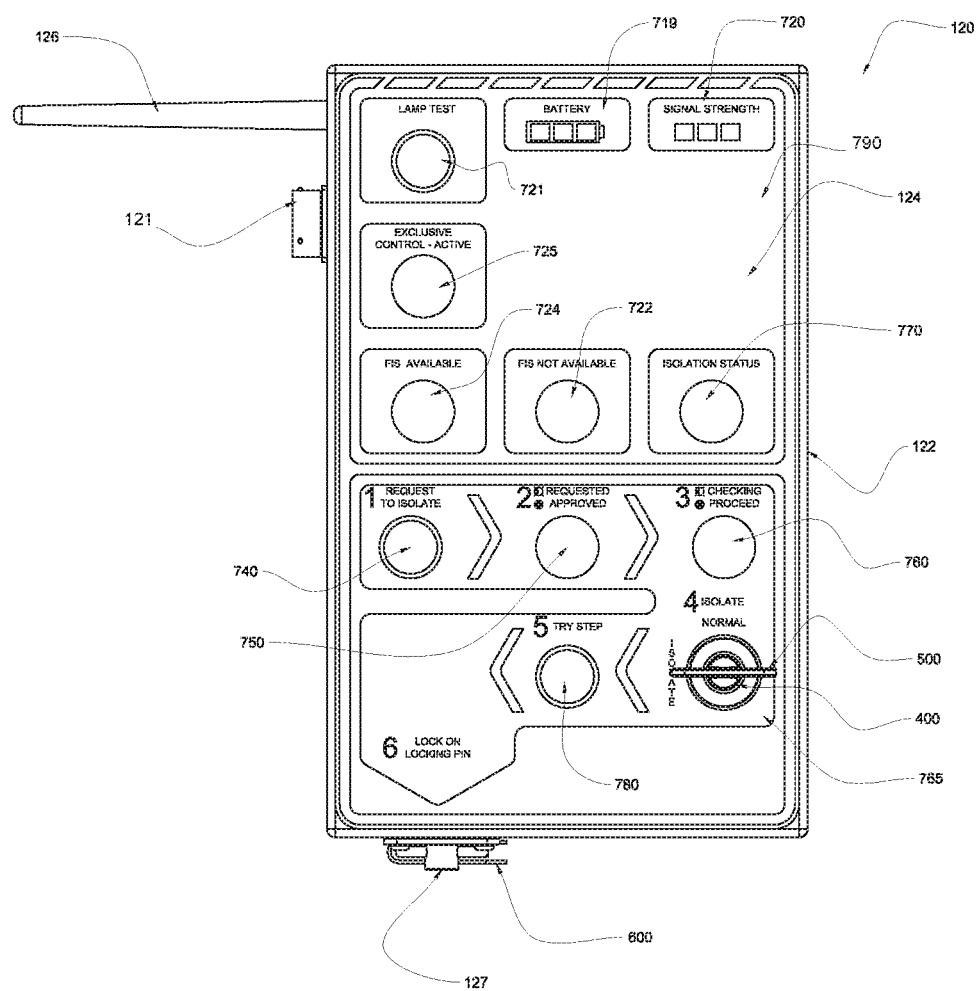
FIG. 2 shows a front view of a mobile isolation device for use in the remote isolation system schematised in FIG. 1, the mobile isolation device being in an isolated condition.
Figure 3:
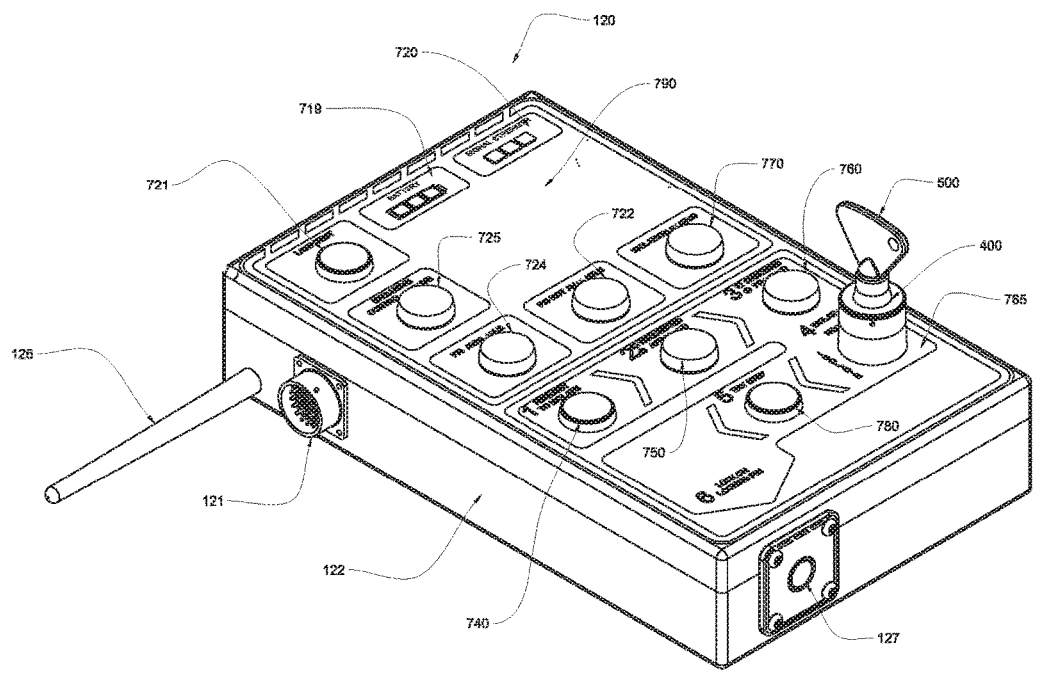
FIG. 3 shows a first side perspective view of the mobile isolation device of FIG. 2 in normal or "resting" position.
Figure 4:
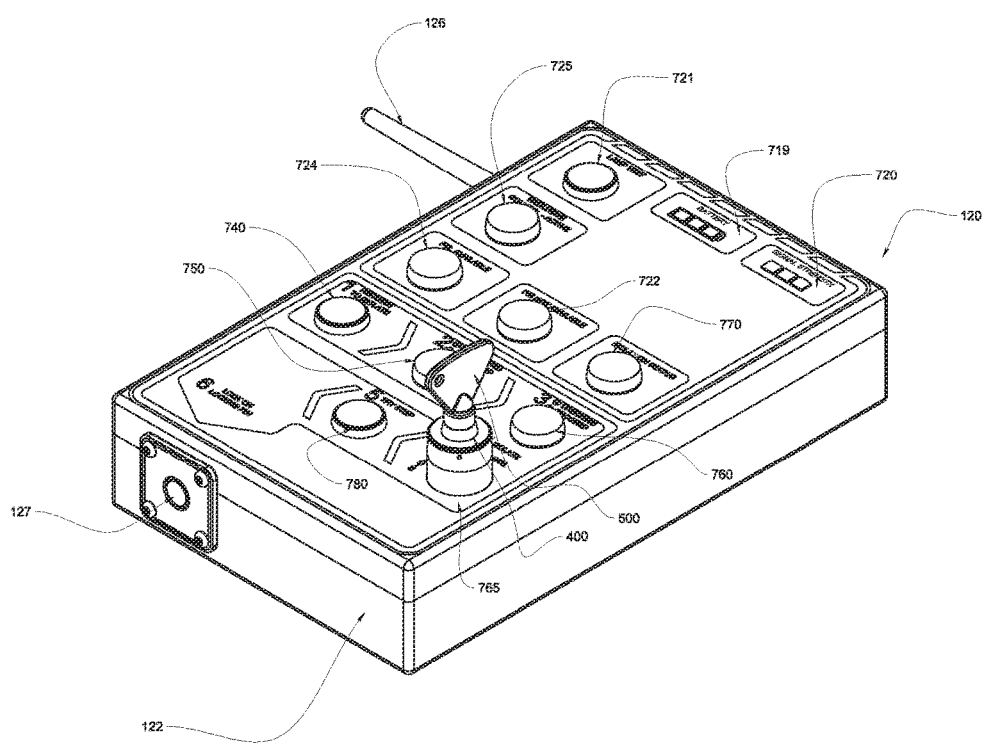
FIG. 4 shows a second side perspective view of the mobile isolation device of FIGS. 2 and 3.

As can be seen in FIG. 2, the control panel 124 includes:
Battery storage indicator light block 719;
Wireless signal strength indicator light block 720;
Lamp test request button 721;
Indicator lights 722 and 724 showing whether or not the mobile isolation device 120 is available for isolation;
Exclusive control selection button 725 for selecting exclusive control and illuminable to indicate whether or not exclusive control is active (exclusive control where conveyor belt system 20 isolation is controlled exclusively from mobile isolation device 120 is described below);
Request to isolate button 740 which is activated by an operator (and which illuminates when pressed) to request isolation;
Request approved indicator light 750 which illuminates to provide status information to said operator;
Indicator light block 760 for indicating checking of the isolation procedure;
Indicator light block 770 for showing whether or not the isolation process is complete following control system checking;
Try step button 780 for requesting a try start step in which a restart of conveyor belt system 20 is attempted (and which illuminates when pressed); and
Graphics (in the form of arrows and text) illustrating the sequence of steps to be followed in the required isolation procedure.

It will be understood that the mobile isolation device 120 could be provided with a touch screen for issuing commands and providing plant status information. A convenient location for such a touch screen would be in block 790 of the isolation device control panel 124. Any such touch screen for the mobile device 120 could conveniently be provided as a low power consumption LCD screen. However, where the isolation device is likely to be subjected to demanding service where wear and damage is almost inevitable, the touch screen may be omitted.

Mobile isolation device 120 may also be provided with alarms in the form of an audible alarm and/or alarm lights as required.

Control panel 124 also includes an equipment isolation switch block 765 which prevents completion of the isolation process (i.e. by locking with an operator's padlock or hasp at a specific lockout point) until the correct remote isolation request procedure, for example as described in Australian Patent No. 2010310881, has been completed. In particular, a correct remote isolation request procedure requires a try start step to be completed by an operator by activation of the try step button 780 before any manual lock out is possible.

Equipment isolation switch 400 co-operates with a switch actuating device here in the form of key 500 whenever remote isolation system 10 is operative, i.e. available to achieve remote isolation, isolation switch 400 and key 500 have no duplicate but together form a replaceable module (with different lock arrangement) in the event of loss of key 500.

Figure 5:
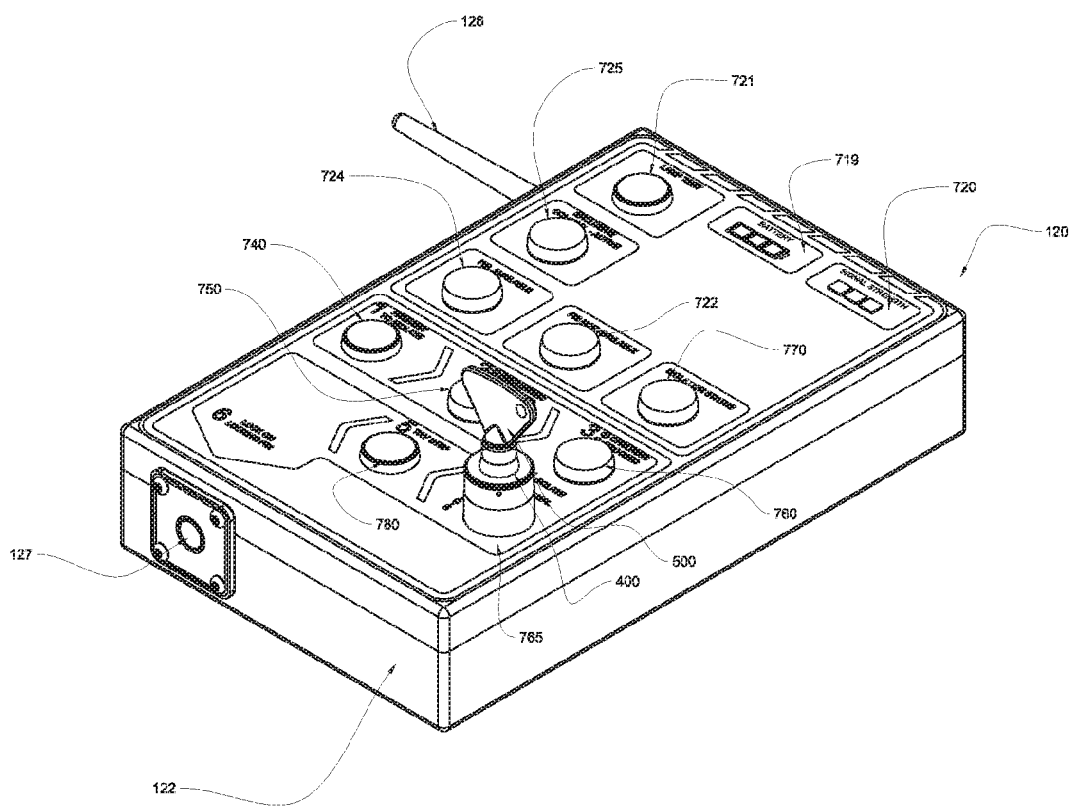
FIG. 5 shows a side perspective view of the mobile isolation device of FIGS. 2 to 4 with isolation switch turned to the ISOLATE position prior to lockout.

With the try start step successfully completed (i.e. confirming that the isolation is effective), equipment isolation switch 400 is now operable by turning the key 500 between a first "NORMAL" position in which the drive motor 22 for the conveyor 21 is electrically energised (i.e. not isolated) and a second "ISOLATE" position in which the drive motor 22 is electrically isolated and thus without power thereby facilitating any maintenance works which may be required. This condition is shown in FIG. 5.

However, whilst turning the key 500 from the NORMAL to the ISOLATE position is a necessary step in establishing an isolation state when authorised by master controller 50, this alone does not provide a sufficient condition for the remote isolation system to properly isolate the conveyor belt 21 and its drive motor 22. Importantly, the equipment isolation switch 400 must be locked out, in this case, by a manual lockout procedure. Authorisation of manual lockout by the master controller 50 requires the correct remote isolation procedure sequence to have been be completed as summarised above and as described in detail for example in the Applicant's Australian Patent No. 2010310881.

Figure 6:
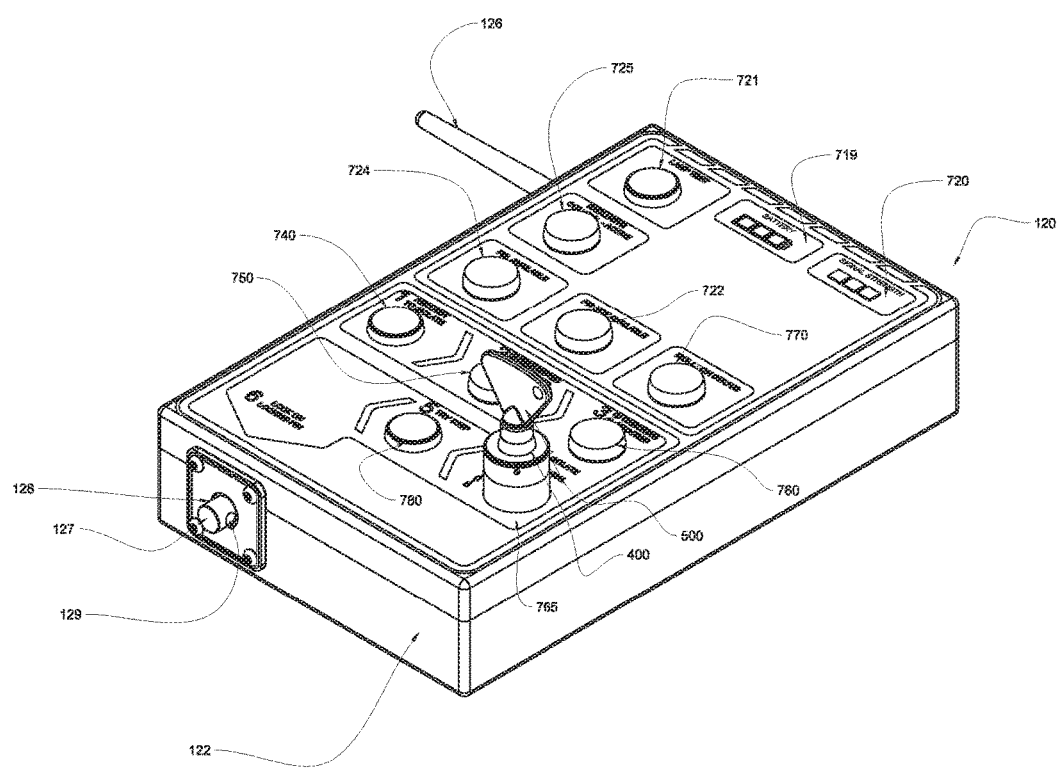
FIG. 6 shows a side perspective view of the mobile isolation device with isolation lockout point provided on completion of an isolation procedure.
Figure 7:
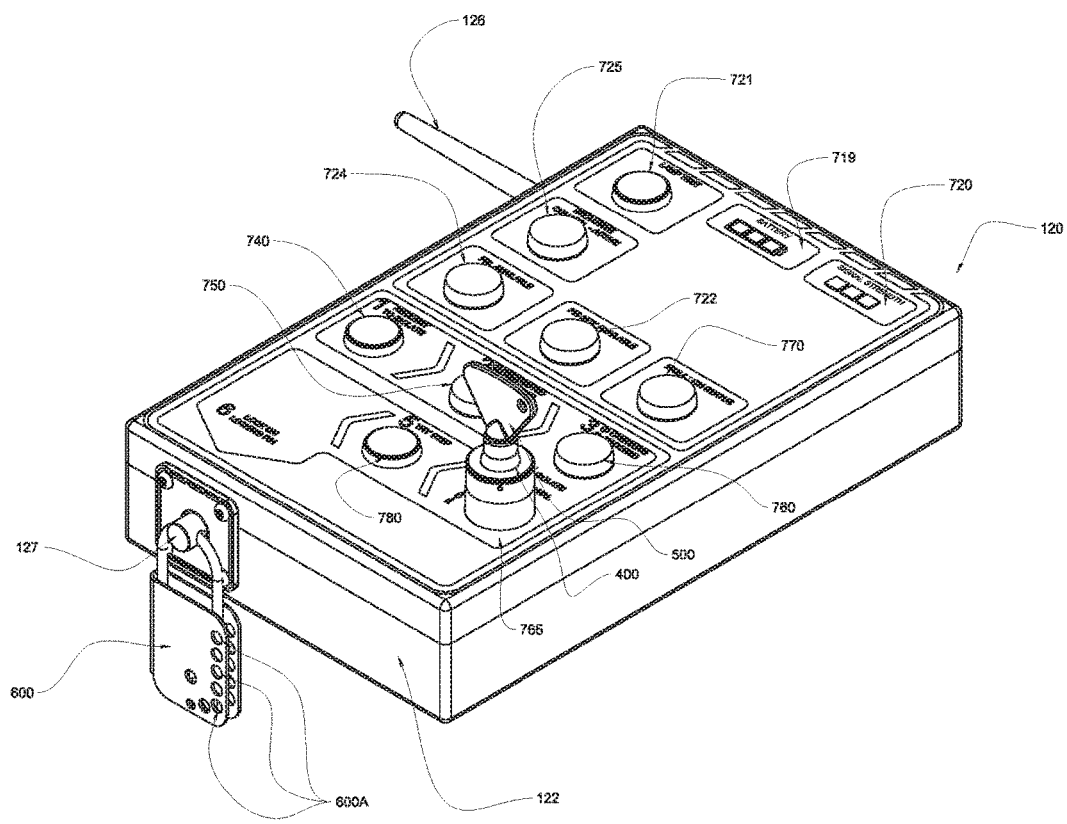
FIG. 7 shows a side perspective view of the mobile isolation device in isolated and locked out condition.

By following the correct remote isolation procedure, an engaging means in the form of an isolation lockout point is provided for the operator at which they can apply a hasp 600 and personal lock. The isolation lockout point is provided by an electrically driven extension of sliding retractable pin 128 (as shown in FIG. 6)—normally located within, and so concealed (though protected) by, a socket 127 of mobile isolation device console 122—at the conclusion of the isolation procedure. A small electric motor (not shown) is provided for this purpose. The isolation lockout point is formed by an aperture 129 extending through a diameter of pin 128 and hasp 600 may readily be applied to this lockout point as shown in FIGS. 2 and 7. Other operators may also need to apply personal locks to the hasp 600 and apertures 600A allow for this. Lockout by an operator at the lockout point provided by pin 128 ensures the isolation switch 400 is unable to returned to a NORMAL condition without certain pre-defined steps as prescribed for the isolation process being followed.

The equipment isolation switch 400 is only operable when the key 500 is engaged with it. Equally, the key 500 must be removed from the isolation switch 400 when deactivation of the equipment isolation switch 400 is required. Control system or authorised personnel approval would be required prior to any such removal which, even then, is only permitted when the isolation switch 400 is in the NORMAL condition. Importantly, key removal is not permitted without additional validation steps if the key switch 400 is in the ISOLATE condition. Deactivation would typically require other tasks to be completed before a remote isolation system is safely and completely removed from service and the equipment item in question can be re-energised for normal operation. Completion of such tasks may involve the use of other keys, preferably rendered operable using the key exchange unit described in the Applicant's Australian Provisional Patent Application No. 2015902557, the contents of which are incorporated herein by way of reference.

It will be understood that communications between the mobile isolation device 120 and plant control system 260 are sent through the wireless communications network and antenna 126 to mobile isolation device 120 other than when the mobile isolation device is docked at the docking station. Hence the operator request is sent wirelessly, as is the control system approval.

A standard isolation mode has been described above, it will however be understood that the control system may provide for selection of one of a plurality of available isolation modes as described in the Applicant's Australian Provisional Patent Application No. 2015902558, the contents of which were incorporated herein by reference above.

Mobile isolation device 120 is particularly useful for use during an exclusive isolation mode in which the conveyor belt 21 is intended to be isolated by de-energising the head pulley drive motor 22 whilst the braking system 21A may be left energised for use during maintenance work. In such case, the mobile isolation device is advantageously configured for use specifically to isolate conveyor belt 20 or braking system 21A. Such configuration may be done when at least one of the mobile isolation devices 120 is stored at, typically docked at, a permitted docking station, conveniently located at the related and specific fixed remote isolation station 12 or the CCR 40, where software updates and battery re-charging can be done using communications and power port 121. However, mobile isolation device 120 may be configured to select different isolation operations and modes from a menu of options and modes if required (e.g. such as the range of isolation modes as described in the Applicant's Australian Provisional Patent Application No. 2015902558, the contents of which are incorporated herein by way of reference. Different mobile isolation devices 120 may be configured with rules and data governing different isolation operations and modes so presenting different operators with different menus of options and modes as this may be required in an isolation process involving multiple operators and multiple tasks.

Docking stations may also be provided elsewhere, for example in vehicles for transporting operators around the plant. Vehicle accessory ports may be used for charging the battery of the mobile isolation device and extending the wireless communication link range.

As noted above, conveyor belt system 20 is a long range conveyor system extending over a substantial distance. Accordingly, the closest fixed remote isolation station 12, 14 may be some distance away from where a fault or problem is diagnosed. Mobile isolation devices 120 enable operator(s) to bridge both the physical distance gap between fixed remote isolation stations and operator location. For example, one operator may carry a mobile isolation device 120 a substantial distance E (as indicated in FIG. 1) from fixed remote isolation station 12. So, when that operator notices an issue requiring attention in their sector of the conveyor belt system 20, return to fixed remote isolation station 12 to deal with that issue is not necessary. The mobile isolation device 120 enables the operator's isolation request to be logged and approved by the control system as soon as the issue is noticed, and at the point where the issue or fault exists. The mobile isolation device 120 may also enable the operator to stop and start conveyor belt system 20 equipment, such as braking systems when required and authorised as in an exclusive mode, and enable isolation switch 400 to be locked out as described above.

The mobile isolation device 120 is also used during de-isolation following a process similar to that described in Australian Patent No. 2010310881. It may be noted that isolation lockout pin 128 would retract into its socket 127 during the de-isolation process subsequent to removal of any personal locks and hasp 800. Following de-isolation, the mobile isolation device may be re-configured for another isolation application, even for different equipment.

The mobile isolation device 120 could be configured, in another embodiment, to only be operated following operator identity verification using operator identification devices as described in the Applicant's Australian Provisional Patent Application Nos. 2015902559 and 2015902564, the contents of which are incorporated herein by way of reference. A smart card identification system could be implemented using a card reader included within the isolation device console 122. Operator identification data would be stored following a conventional process and such data could include isolation permits to enable work on relevant equipment such as the conveyor braking system 21A and other conveyor belt system 20 components. Smart card validity could be checked in the field. This option identifies the operator using the mobile isolation device 120 and reduces the risk of accidental or deliberate misuse of the remote isolation system 10, as well as risk of error in issuing isolation permits through manual documentation systems which can also be time consuming to use and check. Such benefits can contribute to increasing safety and reducing lost production time for maintenance purposes.

Modifications and variations to the remote isolation system described in this specification may be apparent to the skilled reader of this disclosure. Such modifications and variations are deemed within the scope of the present invention. For example, and as described above, the mobile isolation device is one which is configured to dock with a docking station provided at a corresponding fixed remote isolation station. It is however to be appreciated that the mobile isolation device could alternatively be provided as a standalone mobile device that resides in the office or mine site vehicle of an operator of the remote isolation system when it is not is use.

In a further embodiment, the mobile isolation device 120 may be constructed to Ex-rating standards being effectively explosion proof and hence available for use in explosion hazard areas. Still further, the mobile device 120 could be configured to be easily locatable by the control system whereby its location can be determined via wireless triangulation and displayed on the SCADA and HMI screens.

Further, whilst the remote isolation system has been described with reference to a materials handling plant for a mining application, it may be used in a range of industrial and other applications including isolating rail system components in railway infrastructure as described in the Applicant's Australian Provisional Patent Application No. 2015902580, the contents of which have been previously included herein by reference.

The invention claimed is:

1. A remote isolation system for a plant, comprising:
   equipment energisable by an energy source; and
   a control system enabling automated isolation of the equipment from said energy source to an isolated state when authorized by the control system,
   wherein said control system enables remote isolation of the equipment by one or more mobile isolation device(s) provided as part of the remote isolation system and configured to request the control system to authorize equipment isolation; and
   wherein said mobile isolation device comprises:
   a console having a display for displaying information about the remote isolation system and equipment;
   an input device for requesting a control system of the remote isolation system to enable automated equipment isolation through a wireless communications network;
   an isolation switch for isolating said equipment when an isolation request is authorized by the control system;
   and an isolation lockout point.

2. A remote isolation system of claim 1, wherein said control system enables isolation through a wireless communications network which includes the one or more mobile isolation devices configured to request the control system to authorize equipment isolation.

3. A remote isolation system as claimed in claim 2, wherein said wireless communications network uses an open communications protocol.

4. A remote isolation system as claimed in claim 1, wherein each mobile isolation device enables wireless communication with said control system to enable equipment isolation on authorization of a permissible request from an operator.

5. A remote isolation system as claimed in claim 1, wherein each mobile isolation device comprises a console having a display for displaying information about the remote isolation system and equipment; an input device for requesting a control system of the remote isolation system to enable automated equipment isolation through the above described wireless communications network; an isolation switch for isolating said equipment when an isolation request is authorized by the control system; and an isolation lockout point.

6. A remote isolation system as claimed in claim 5, wherein said isolation lockout point includes means for engaging a personal isolation lock.

7. A remote isolation system as claimed in claim 6, wherein said engaging means is presented to an operator by the mobile isolation device when the isolation switch is in an isolated position.

8. A remote isolation system as claimed in claim 7, wherein said engaging means is a sliding element concealed within the console of the mobile isolation device when equipment is energized but which slides into position when the equipment is isolated, said sliding element being provided with attachment means, such as an aperture, for attaching a personal isolation lock.

9. A remote isolation system as claimed in claim 8, wherein said sliding element is retractable into said console of said mobile isolation device on de-isolation.

10. A remote isolation system as claimed in claim 1, including at least one fixed remote isolation station for logging isolation requests for the equipment wherein said mobile isolation device enables logging of isolation requests, approved isolation and isolation lockout without using said fixed remote isolation station.

11. A remote isolation system as claimed in claim 5, wherein each mobile isolation device includes stop and start controls for facilitating equipment isolation on authorization of the permissible request from the operator.

12. A remote isolation system as claimed in claim 1, comprising at least one fixed remote isolation station wherein each mobile isolation device is configured to engage with a specific fixed remote isolation station.

13. A remote isolation system as claimed in claim 1, wherein said mobile isolation device is designed to dock with a docking station for a purpose selected from the group consisting of re-charging of the mobile isolation device, communication with and programming by the control system and plugging in to other peripherals of the remote isolation system.

14. A remote isolation system as claimed in claim 1, wherein each mobile isolation device includes locating means so that the location of the mobile isolation device can be easily determined.

15. A remote isolation system as claimed in claim 5, wherein said control system is configured with a plurality of equipment isolation modes; and the input device of the mobile isolation device allows an operator to select one of said equipment isolation modes.

16. A remote isolation system as claimed in claim 15, comprising a plurality of mobile isolation devices each having input device configured to enable each operator to select the same plurality of equipment isolation modes.

17. A remote isolation system as claimed in claim 15, comprising a plurality of mobile isolation devices having input device configured to enable each operator to select a different plurality of equipment isolation modes.

18. A remote isolation system as claimed in claim 1, wherein the control system is configured to isolate an equipment item whilst leaving other associated equipment items either operating or in an operational state.

19. A remote isolation system as claimed in claim 1, wherein said mobile isolation device is rendered inoperative if the remote isolation system is bypassed or over-ridden in the event of a system fault.

20. A remote isolation system as claimed in claim 13, wherein said mobile isolation device can only be withdrawn or 'undocked' from a docking station on approval by said control system.

21. A remote isolation system as claimed in claim 1, wherein said mobile isolation device is provided with an operator identification device for receiving operator identification data from an operator identification means and configured to only be operated following operator identity verification.

22. A remote isolation system as claimed in claim 21, wherein said operator identification means is a smart device or smart card.

23. A remote isolation system as claimed in claim 22, wherein said smart device or smart card is used for lock out of an isolation lockout switch when provided as part of the mobile isolation device.

24. A remote isolation system as claimed in claim 1, used to isolate equipment in an application selected from the group consisting of mining, materials handling and railway infrastructure operation.

25. A remote isolation system as claimed in claim 1, wherein said equipment is located in a terrain or landscape subject to change.

26. A mobile isolation device when used in a remote isolation system as claimed in claim 1.

27. A mobile isolation device for a remote isolation system, comprising:
 a console having a display for displaying information about the remote isolation system and equipment;
 an input device for requesting a control system of the remote isolation system to enable automated equipment isolation through a wireless communications network;
 an isolation switch for isolating said equipment when an isolation request is authorized by the control system; and an isolation lockout point.

28. A mobile isolation device as claimed in claim 27, wherein said isolation lockout point includes means for engaging a personal isolation lock.

29. A mobile isolation device as claimed in claim 28, wherein said engaging means is presented to an operator by the mobile isolation device when the isolation switch is in an isolated position.

30. A mobile isolation device as claimed in claim 29, wherein said engaging means is a sliding element concealed within the console of the mobile isolation device when equipment is energized but which slides into position when the equipment is isolated, said sliding element being provided with attachment means, such as an aperture, for attaching the personal isolation lock.

31. A mobile isolation device as claimed in claim 30, wherein said sliding element is retractable into said console of said mobile isolation device on de-isolation.

32. A mobile isolation device as claimed in claim 27, being provided with an operator identification device for receiving operator identification data from an operator identification means and configured to only be operated following operator identity verification.

33. A mobile isolation device as claimed in claim 32, wherein said operator identification means is a smart device or smart card programmed with operator identification data.

34. A mobile isolation device as claimed in claim 33, wherein said smart device or smart card is used for lock out of said isolation switch.

35. A mobile isolation device as claimed in claim 27, wherein said equipment is located in a terrain or landscape subject to change.

* * * * *